United States Patent
Habert et al.

(10) Patent No.: US 11,420,566 B2
(45) Date of Patent: Aug. 23, 2022

(54) TRIM ELEMENT COMPRISING A RETRACTABLE STORAGE VOLUME

(71) Applicant: FAURECIA INTERIEUR INDUSTRIE, Nanterre (FR)

(72) Inventors: Cédric Habert, Le Fay Saint Quentin (FR); Alain Nguyen, La Queue en Brie (FR)

(73) Assignee: FAURECIA INTERIEUR INDUSTRIE, Nanterre (GB)

( * ) Notice: Subject to any disclaimer, the term of this patent is extended or adjusted under 35 U.S.C. 154(b) by 183 days.

(21) Appl. No.: 16/661,614

(22) Filed: Oct. 23, 2019

(65) Prior Publication Data

US 2020/0122650 A1   Apr. 23, 2020

(30) Foreign Application Priority Data

Oct. 23, 2018 (FR) ...................................... 18 59782

(51) Int. Cl.
*B60R 7/04* (2006.01)
*B29L 31/30* (2006.01)
*B60R 13/02* (2006.01)

(52) U.S. Cl.
CPC ......... *B60R 7/04* (2013.01); *B29L 2031/3041* (2013.01); *B60R 13/0237* (2013.01); *B60R 13/0262* (2013.01); *B60R 13/0268* (2013.01); *B60R 2013/0287* (2013.01)

(58) Field of Classification Search
CPC .............. B60R 7/06; B60R 7/04; B60R 7/005
USPC .............................................. 296/37.13, 37.8
See application file for complete search history.

(56) References Cited

U.S. PATENT DOCUMENTS

| 3,088,771 A | * | 5/1963 | Weigle | ..................... B60N 3/08 296/37.5 |
| 9,421,916 B1 | * | 8/2016 | Dyle | ......................... B60R 7/04 |
| 10,363,878 B1 | * | 7/2019 | Lee | .......................... B60R 7/005 |
| 2013/0187400 A1 | * | 7/2013 | D.Alessandro | ........... B60R 7/04 296/24.34 |

(Continued)

FOREIGN PATENT DOCUMENTS

| DE | 20315236 U1 | 12/2003 |
| DE | 10326883 A1 | 1/2005 |

(Continued)

OTHER PUBLICATIONS

Machine Translation of FR2909053A1, printed from the EPO website, Jun. 19, 2021.*

(Continued)

*Primary Examiner* — Jason S Morrow
(74) *Attorney, Agent, or Firm* — Reising Ethington P.C.

(57) ABSTRACT

A trim element having a body and a covering element extending over part of the body. The covering element includes at least two substantially rigid panels connected to one another by a flexible branch forming a bending line of the panels relative to one another and fastened to the body by a fastening edge forming a hinge between the panels and the body, the covering element being deformable around the bending line. The covering element hinges between a retracted position, in which the panels of the covering element are pressed against the body, and a deployed position, in which the panels are moved away from the body, the covering element defining a storage volume with the body in the deployed position.

14 Claims, 2 Drawing Sheets

(56) References Cited

U.S. PATENT DOCUMENTS

| | | | |
|---|---|---|---|
| 2016/0059790 A1* | 3/2016 | Perelli | B60R 7/02 |
| | | | 224/486 |
| 2016/0325688 A1* | 11/2016 | Dyle | B60N 3/102 |
| 2017/0274745 A1* | 9/2017 | Lewis | B60R 5/04 |
| 2017/0291733 A1* | 10/2017 | Henderson | B65D 11/1873 |
| 2020/0023781 A1* | 1/2020 | Tiboni | B60R 7/04 |
| 2021/0114527 A1* | 4/2021 | Tettenborn | B29C 45/16 |
| 2021/0362655 A1* | 11/2021 | Hoppel | B60R 7/06 |

FOREIGN PATENT DOCUMENTS

| | | | | |
|---|---|---|---|---|
| DE | 102017006320 A1 * | 1/2019 | | B60R 7/005 |
| FR | 2909053 A1 | 5/2008 | | |

OTHER PUBLICATIONS

French Search Report corresponding to French application No. FR 1859782, dated Apr. 16, 2019, 2 pages.

* cited by examiner

TRIM ELEMENT COMPRISING A RETRACTABLE STORAGE VOLUME

TECHNICAL FIELD

The present invention relates to a vehicle trim element of the type comprising a body and a covering element extending over at least part of the body and defining at least part of the outer surface of the trim element.

BACKGROUND

Such a trim element is for example intended to form a door panel of a vehicle. It is known to provide a storage volume in a trim element so that the passengers of the vehicle can store compact items therein. Such a storage volume is for example referred to as parcel tray.

The storage volume is for example defined by the particular shape of the body of the trim element, which comprises a protruding part and a space able to receive the objects. Thus, the storage volume is unmovable and always takes up a certain amount of space in the passenger compartment of the vehicle, even when it is not in use.

In order to free up space in the passenger compartment, storage volumes that can be retracted when they are not in use have been provided. Thus, the trim element comprises a deformable structure that can be placed in a deployed position in which this structure defines a storage volume. The storage volume then only takes up room in the passenger compartment of the vehicle when it is in use. When it is not in use, additional room is freed in the passenger compartment, which improves passenger comfort in the passenger compartment.

However, such a structure requires a mechanism allowing it to be deployed, which complicates the structure of the trim element and raises layout problems thereof to make it possible to add this deployment mechanism.

SUMMARY

One of the aims of the invention is to offset these drawbacks by proposing a trim element comprising a retractable storage volume, the movement of which is done simply without requiring a particular deployment mechanism.

To that end, the invention relates to a trim element of the aforementioned type, wherein the covering element comprises at least two substantially rigid panels connected to one another by a flexible branch forming a bending line of the panels relative to one another and fastened to the body by at least one fastening edge forming a hinge between the panels and the body, the covering element being deformable around the bending line, and hinges between a retracted position, in which the panels of the covering element are pressed against the body, and a deployed position, in which the panels are moved away from the body, the covering element defining a storage volume with the body in the deployed position.

In order to deploy the storage volume of the trim element, one thus only has to deform the covering element, which gets positioned in the deployed position by simple bending around the bending line and hinges. It is thus not necessary to add a particular deployment mechanism, that is to say, a mechanism acting on the covering element to cause it to go from its retracted position to its deployed position. The trim element is thus simplified while offering a retractable storage volume. Furthermore, the appearance of the trim element can be improved, in particular by making the bending line visible in order to impart a particular esthetic to the outer surface of the trim element.

According to other optional features of the trim element according to the invention, considered alone or according to any technically conceivable combination:
- the retracted position and the deployed position are stable positions;
- the covering element is formed in one piece, at least one rigid material forming the panels and at least one flexible material forming the flexible branch;
- the covering element comprises at least three panels, including two side panels and one central panel, the central panel being connected to each of the side panels by flexible branches forming bending lines between the central panel and the side panels;
- the central panel is triangular, the side panels being polygons comprising at least four sides, the central panel being fastened to the body by one of its edges forming a hinge, the other two edges being connected to the side panels by flexible branches, and the side panels being fastened to the body by at least one of their edges and to the central panel by another edge;
- the storage volume in the deployed position is accessible through an opening extending between the covering element and the body, part of the opening being delimited by a free edge of at least one panel of the covering element, said free edge being separated from the body in the deployed position;
- the bending line formed by the flexible branch extends over the outer surface of the covering element in order to be visible from the outside of the trim element;
- the trim element further comprises a locking device keeping the covering element in the retracted position when said locking device is in a locked configuration;
- the covering element enters its deployed position when the locking device goes from the locked configuration to an unlocked configuration;
- the trim element forms a vehicle door panel.

BRIEF DESCRIPTION OF THE DRAWINGS

Other aspects and advantages of the invention will appear upon reading the following description, provided as an example, and done in reference to the appended drawings, in which.

DETAILED DESCRIPTION

In the description, the term "inner" refers to that which is facing the body of the vehicle, and the term "outer" refers to that which is facing the passenger compartment of the vehicle.

Figure 1:
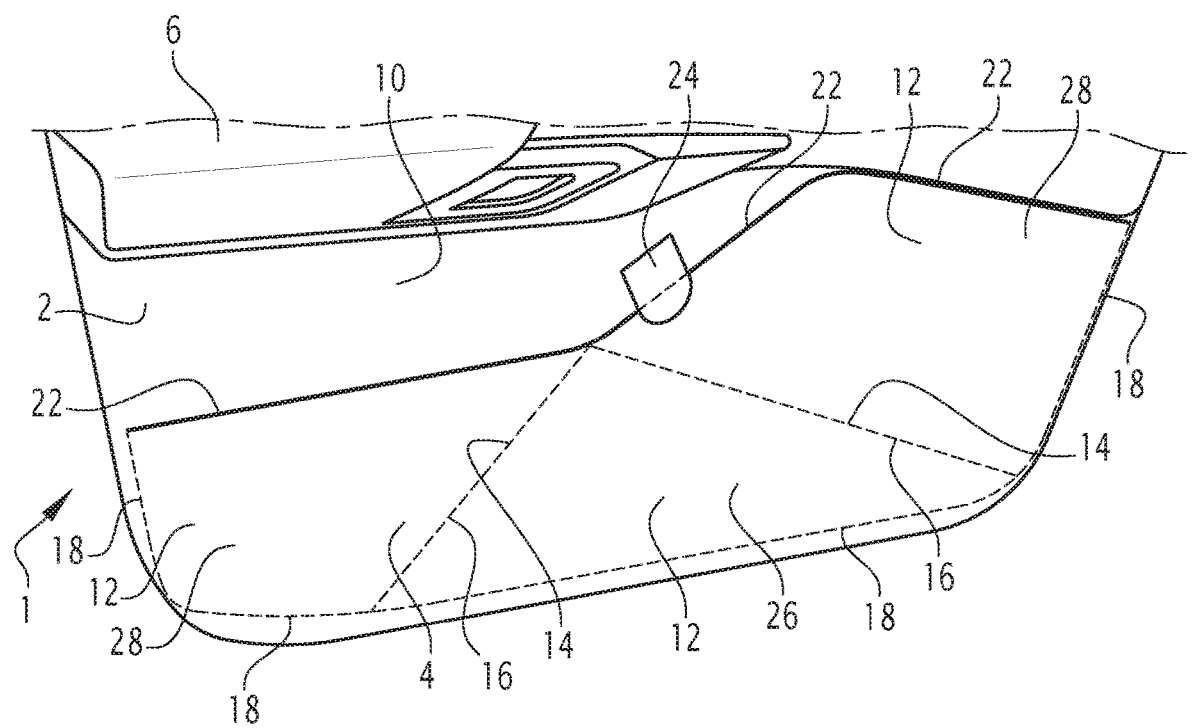
FIG. 1 is a schematic perspective illustration of a trim element according to an embodiment of the invention, the covering element being in the retracted position.

In reference to FIG. 1, a vehicle trim element 1 is disclosed comprising a body 2 and a covering element 4 extending over at least part of the body 2 and defining at least part of the outer surface of the trim element. "Outer surface" refers to the visible part of the trim element 1 when it is mounted in a vehicle, for example a motor vehicle. In the figures, the trim element 1 is a door panel suitable for being mounted on a vehicle door in order to form the outer face thereof below the window. It is, however, understood that the invention applies to other types of trim elements, such as the lining of a seat, the covering of a dashboard, etc.

The body 2 can be molded to perform different functions, such as a bearing surface 6, for example an armrest, access to a window regulator system, etc. In the area where the covering element 4 is provided, the body 2 is intended to delimit a storage volume 8, as will be described later.

According to the embodiment shown in the figures, the covering element 4 only extends over part of the body 2. The outer surface of the trim element 1, outside the covering element 4, is for example formed by a covering layer 10 applied on the body 2. In this case, the covering element 4 for example extends above the covering layer 10, in the area where the covering element 4 forms the outer surface of the trim element 1, that is to say, in this area from the inside toward the outside, the trim element 1 successively comprises the body 2, the covering layer 10 and the covering element. In the embodiment shown in the figures, the covering element 4 extends in a lower part of the body 2 so as to form a storage volume 8 extending below the bearing surface 6. The term "lower" is defined relative to the elevation direction of the trim element 1, which for example corresponds to a substantially vertical direction in the case of a door trim installed in a vehicle.

The covering element 4 comprises at least two substantially rigid panels 12. "Rigid" means that the panels 12 retain their shape and do not deform under the effect of a typical constraint in a vehicle, for example when a passenger presses on or exerts a tensile force on the covering element 4. In other words, under normal usage conditions of the vehicle, the panels 12 are substantially nondeformable. To that end, the panels 12 are made from a rigid material, for example a plastic material, such as polypropylene (PP) or acrylonitrile butadiene styrene (ABS). The panels 12 are for example substantially flat or slightly domed. They for example have a polygonal shape, as will be described later in reference to the specific embodiment shown in the figures. The panels 12 can be covered on one or both of their faces with a trim layer, intended to impart a particular appearance to the covering element 4. According to one embodiment, the panels 12 are each arranged in a pouch, for example made from a textile material.

The panels 12 are articulated to one another along one of their edges, called articulation edge 14, by a flexible branch 16 forming a bending line between the panels 12. "Flexible" means that the branch is deformable so as to allow a movement of the panels 12 relative to one another. The flexible branch 16 is made from a flexible material, that is to say, more flexible than the material used to make the panels 12, for example a plastic material, such as ethylene-propylene-diene monomer (EPDM), polyurethane (PU) or polypropylene (PP). According to one embodiment, the covering element 4, that is to say, the panels 12 and the flexible branch 16, is made in one piece, for example by overmolding the flexible branch 16 on the panels 12. In a variant, the flexible branch 16 is formed by a seam, for example when the panels 12 are arranged in a textile pouch, the seam connecting the textile pouches to one another. According to another variant, the flexible branch 16 is formed by a weakening of material between the panels 12, that is to say, the panels are integral and a material weakening extends between them. Thus, the flexible branch 16 that extends in the covering element 4 between the panels 12 allows a deformation of the covering element 4 that can change shape by bending the rigid panels 12 relative to one another around the flexible branch 16.

According to one embodiment, the flexible branch 16 extends on the side of the outer surface of the covering element 4, so as to be visible from the outside of the trim element 1. Thus, the flexible branch 16 forms a style line on the outer surface of the covering element 4 and participates in giving it a particular esthetic.

The panels 12 are also fastened to the body 2 along at least part of at least one other of their edges, called fastening edge 18. "One other of their edges" refers to an edge different from the articulation edge 14, or another part of the edge, when the panel only comprises one edge, for example in the case of a circular panel.

The fastening edge(s) 18 are fastened to the body 2 so as to form a hinge between the panel 12 and the body 2, that is to say, so as to allow a movement of the panel 12 relative to the body 2 around the fastening edge 18. The fastening of the fastening edge 18 to the body 2 is for example obtained by a branch made from the same material as the flexible branch 16 and assembled on the body 2, for example by sewing, welding, gluing or the like, in particular depending the material used to make the fastening edge 18.

Figure 2:
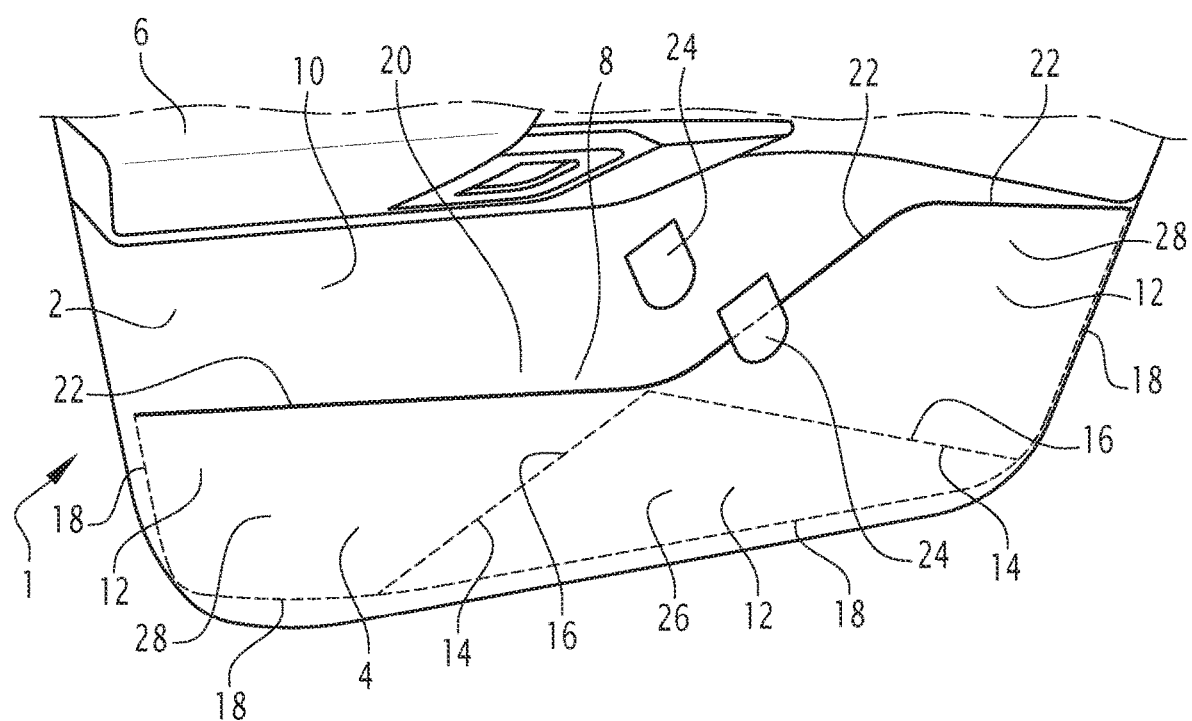
FIG. 2 is a schematic perspective illustration of the trim element of FIG. 1, the covering element being in the deployed position.

When the covering element 4 is fastened on the body 2, the covering element 4 is thus deformable between a retracted position, shown in FIG. 1, and a deployed position, shown in FIG. 2. The deformation is obtained by a movement of the panels 12 relative to the body 2 around fastening edges 18 and by movement of the panels 12 relative to one another around the flexible branch 16.

In the retracted position, the covering element 4 is pressed against the body 2 so as to marry the shape thereof. Thus, in the retracted position, the covering element 4 does not take up a space protruding outside the body 2. Thus, in the retracted position, the trim element 1 has a reduced bulk and frees a space in the passenger compartment, which improves comfort for the passengers, who have more free space in the passenger compartment.

In the deployed position, the panels 12 are moved away from the body 2 owing to the movement of the panels 12 relative to the body 2, around hinges formed by the fastening edges 18, and relative to one another, around the bending line formed by the flexible branch 16. "Moved away panel" means that, in the deployed position, only the fastening edge(s) 18 of the panel 12 remain against the body 2, the rest of the panel being spaced away from the body 2. In the deployed position, the flexible branch 16 forms a sharp edge at the transition between the two panels 12, which imparts a particular esthetic to the covering element 4 in this position.

In this deployed position, the covering element 4 forms, with the body 2, a storage volume 8 extending between the inner face of the panels 12 and the outer face of the body 2. The bottom of the storage volume 8 is formed at the junction between at least part of the fastening edges 8 of the panels 12 and the body 2, as shown in FIG. 2. The storage volume 8 is accessible through an opening 20 delimited by a free edge 22 of the panels 12, different from the fastening 16 and articulation 14 edges. "Different" refers to another edge or another edge part, in the case of a panel comprising only one edge. The free edges 22 are separated from the body 2 in the deployed position so as to free a passage through the opening 20 toward the inside of the storage volume 8, as shown in FIG. 2. In the retracted position, the free edges 22 are pressed against the body 2, as shown in FIG. 1. According to the embodiment shown in the figures, the free edges 22 form upper edges of the covering element 4, in the elevation direction, such that the opening 20 extends to the upper end of the covering element 4 in the deployed position.

Thus, in the deployed position, the trim element 1 takes up more space in the passenger compartment, since the storage volume 8 protrudes from the body 2 toward the passenger compartment. However, in this position, the passenger compartment offers additional storage room.

In the deployed position, the storage volume allows containing quite heavy objects without deformation of the shape of the storage volume. In other words, the storage volume is self-sustaining.

The retracted and deployed positions are stable positions, which is to say that the covering element 4 remains in the retracted or deployed position in the absence of outside stress on the covering element 4.

To that end, the trim element 1 for example comprises a locking device 24 arranged to keep covering element 4 in its retracted position when the locking device 24 is in a locked configuration. The locking device 24 is for example formed by magnetized elements provided on the body and on the covering element 4, for example at a free edge 22. Thus, by bringing the covering element 4 closer to the body 2, the magnetic elements of the locking device 24 cooperate with one another to keep the covering element in the retracted position. To unlock the locking device 24, it suffices for a user to pull on the covering element 4 so as to overcome the magnetic force between the magnetized elements. It is understood that the locking device 24 could have another shape, such as one or several clips arranged to cooperate with one or several openings provided in the body 2, in the retracted position. In a variant, the maintenance of the covering element 4 in the retracted position is ensured by a particular shape of the covering element and/or the body 2.

The passage of the covering element 4 into the deployed position when the locking device 24 is unlocked is for example done due to gravity, owing to the weight of the panels 12. The weight of the panels 12 in this case ensures the stability of the covering element 4 in the deployed position. In a variant, a manual action by a user is necessary to transition the covering element 4 into the deployed position in addition to the unlocking of the locking device 24.

Thus, the passage from the retracted position to the deployed position does not require any particular mechanism to move the covering element 4, which simplifies the structure of the trim element. To transition the covering element 4 into its retracted position, it suffices to bring the covering element 4 closer to the body 2 manually.

The trim element 1 thus has a simple structure, is easy to use and has a satisfactory appearance.

We will now describe one specific exemplary embodiment of the covering element 4, as shown in FIGS. 1 and 2.

According to this embodiment, the covering element 4 comprises three panels 12, namely a central panel 26 and two side panels 28.

The central panel 26 is connected to each of the side panels 28 by a flexible branch 16 so as to be articulated to each of these side panels 28 around a bending line. Such an embodiment makes it possible to form a storage volume 8 with large dimensions and assuming a shape suitable for its function.

According to this embodiment, the central panel 26 for example has a triangular shape, two of the edges of which are articulation edges 14, each connected to a side panel 28 by a flexible branch 16, and the third edge is a fastening edge 18. Each side panel 28 is a polygon comprising at least four edges, one of which forms an articulation edge 14, connected to the central panel 26 by a flexible branch 16. At least one other edge of each side panel 28 is a fastening edge 18 fastened to the body 2 and forming a hinge with the body 2. Another edge is a free edge 22 forming an edge of the opening 20 of the storage volume 8 when the covering element is in the deployed position. According to the embodiment shown in FIGS. 1 and 2, one of the side panels 28 comprises two fastening edges 18 and a free edge 22 while the other side panel 28 comprises one fastening edge 18 and two free edges 22, which makes it possible to impart a specific shape to the opening 28 of the storage volume 8 in the deployed position and a pleasant esthetic in the retracted position. According to this embodiment, the central panel 26 does not comprise a free edge.

It is understood that the panels could have other shapes. Thus, the central panel 26 could comprise a free edge delimiting the opening and no fastening edge, in the case of a triangular panel, or comprise at least one free edge and at least one fastening edge, in the case of a polygonal panel with at least four edges. The side panels could be polygons comprising more or fewer than four edges. It is also understood that the covering element 4 can comprise more than three panels, connected to one another by flexible branches forming bending lines. By arranging the shape and choosing the number of panels, it is possible to modify the shape and the appearance of the covering element 4, both in the deployed position and in the retracted position, while retaining simple use of the trim element to take it from one position to the other.

The invention claimed is:

1. A vehicle trim element comprising a body and a covering element extending over at least part of the body and defining at least part of an outer surface of the trim element,
   wherein the covering element comprises at least three substantially rigid panels, including two side panels and one central panel, the central panel being connected to each of the side panels by flexible branches forming bending lines between the central panel and the side panels, and each panel being attached to the body by a respective fastening edge forming a respective hinge between each panel and the body,
   the covering element being deformable around the bending lines and hinges between a retracted position, in which the panels of the covering element are pressed against the body, and a deployed position, in which the panels are moved away from the body, the covering element defining a storage volume with the body in the deployed position,
   wherein the rigid panels retain their shape and are non-deformable under normal usage conditions of the vehicle.

2. The trim element according to claim 1, wherein the retracted position and the deployed position are stable positions.

3. The trim element according to claim 1, wherein the covering element is formed in one piece, at least one rigid material forming the panels and at least one flexible material forming the flexible branch.

4. The trim element according to claim 1, wherein the central panel is triangular, the side panels being polygons comprising at least four edges, one edge of each side panel being the fastening edge forming the hinge between the respective side panel and the body, and another edge of each side panel being connected to the central panel by one of the flexible branches.

5. The trim element according to claim 1, wherein the storage volume in the deployed position is accessible through an opening extending between the covering element and the body, part of the opening being delimited by a free edge of at least one panel of the covering element, said free edge being separated from the body in the deployed position.

6. The trim element according to claim 1, wherein the bending line formed by each flexible branch extends over the outer surface of the covering element in order to be visible from the outside of the trim element.

7. The trim element according to claim 1, further comprising a locking device keeping the covering element in the retracted position when said locking device is in a locked configuration.

8. The trim element according to claim 7, wherein the covering element enters its deployed position when the locking device goes from the locked configuration to an unlocked configuration.

9. The trim element according to claim 1, said trim element forming a vehicle door panel, a central console, or a trim element of a vehicle trunk.

10. The trim element according to claim 1, wherein a bottom of the storage volume is formed at a junction between at least part of at least one of the fastening edges and the body.

11. A vehicle trim element comprising a body and a covering element extending over at least part of the body and defining at least part of an outer surface of the trim element, wherein the covering element comprises at least three substantially rigid panels including two side panels and one central panel connected to each of the side panels by flexible branches forming bending lines between the central panel and the side panels, the covering element being fastened to the body by at least one fastening edge forming a hinge between the panels and the body, the covering element being deformable around the bending lines and hinge between a retracted position, in which the panels of the covering element are pressed against the body, and a deployed position, in which the panels are moved away from the body, the covering element defining a storage volume with the body in the deployed position,
    wherein the central panel is triangular and the side panels are polygons comprising at least four edges, the central panel being fastened to the body by one of its edges forming the hinge, the other two edges of the central panel being connected to the side panels by the flexible branches, and the side panels being fastened to the body by at least one of their edges and to the central panel by another one of their edges.

12. A vehicle trim element comprising a body and a covering element extending over at least part of the body and defining at least part of an outer surface of the trim element, wherein the covering element comprises at least three panels connected to one another by flexible branches forming bending lines of the panels relative to one another, each panel being fastened to the body by at least one fastening edge forming a hinge between each panel and the body, the covering element being deformable around the bending lines and hinges between a retracted position, in which the panels of the covering element are pressed against the body, and a deployed position, in which the panels are moved away from the body, the covering element defining a storage volume with the body in the deployed position,
    wherein the flexible branches are made from a material that is more flexible than a material used to make the panels.

13. The trim element according to claim 1, wherein the at least three substantially rigid panels form a bottom and walls of the storage volume in the deployed position.

14. The trim element according to claim 12, wherein the at least three panels form a bottom and walls of the storage volume in the deployed position.

\* \* \* \* \*